Feb. 6, 1968  H. J. TYLER  3,367,574
CONTROL DEVICE AND PARTS THEREFOR OR THE LIKE
Filed June 7, 1965  6 Sheets-Sheet 1

FIG.1

INVENTOR
HUGH J. TYLER

BY

*Caudn & Caudn*

HIS ATTORNEYS

Feb. 6, 1968   H. J. TYLER   3,367,574
CONTROL DEVICE AND PARTS THEREFOR OR THE LIKE
Filed June 7, 1965   6 Sheets-Sheet 3

INVENTOR
HUGH J. TYLER
BY
Caudn & Caudn
HIS ATTORNEYS

FIG. 6

Feb. 6, 1968  H. J. TYLER  3,367,574
CONTROL DEVICE AND PARTS THEREFOR OR THE LIKE
Filed June 7, 1965  6 Sheets-Sheet 5

INVENTOR
HUGH J. TYLER

BY
Caudr & Caudr
HIS ATTORNEYS

FIG.10

United States Patent Office 3,367,574
Patented Feb. 6, 1968

3,367,574
CONTROL DEVICE AND PARTS THEREFOR
OR THE LIKE
Hugh J. Tyler, Jeannette, Pa., assignor to Robertshaw
Controls Company, Richmond, Va., a corporation of
Delaware
Filed June 7, 1965, Ser. No. 462,033
17 Claims. (Cl. 236—99)

ABSTRACT OF THE DISCLOSURE

This disclosure relates to a control means for a fuel burning main burner means wherein the control means has a single selector means for controlling the main fuel inlet valve means through part of the movement of the selector means and has a second valve means for thermostatically controlling the on-off operation of the main burner means with the selector means adjusting the operating effect of the second valve means throughout the entire range of movement of the control knob, the second valve means being thermostatically controlled to cycle on and off the flow of fuel to a controller pilot burner means that has the flame means thereof sensed by a safety valve means that is located downstream from the control means and controls the flow of fuel to the main burner means at a point downstream from the control means.

This invention relates to an improved control device for controlling the operation of a heating means or the like as well as to improved parts for such a control device or the like.

One feature of this invention is to provide an improved control device for controlling the operation of the burner means of a domestic oven or the like in such a manner that the control device can be set at a selected temperature by a control knob, the control knob initially opening a main valve of the control device and, thereafter, be disconnected therefrom to further adjust the temperature setting of the device in a unique and effective manner without further adjusting the main valve until it is desired to turn off the control device of this invention.

Accordingly, it is an object of this invention to provide an improved control device having one or more of the novel features set forth above or hereinafter shown or described.

Another object of this invention is to provide an improved part for such a control device or the like.

Other objects, uses and advantages of this invention are apparent from a reading of this description which proceeds with reference to the accompanying drawings forming a part thereof and wherein:

While the various features of this invention are hereinafter described and illustrated as being particularly adaptable to provide a control device for a fuel burning domestic oven or the like, it is to be understood that the various features of this invention can be utilized singly or in any combination thereof to provide a control device for other structure as desired.

Therefore, this invention is not to be limited to only the embodiment illustrated in the drawings because the drawings are merely utilized to illustrate one of the wide variety of uses of this invention.

Figure 1:
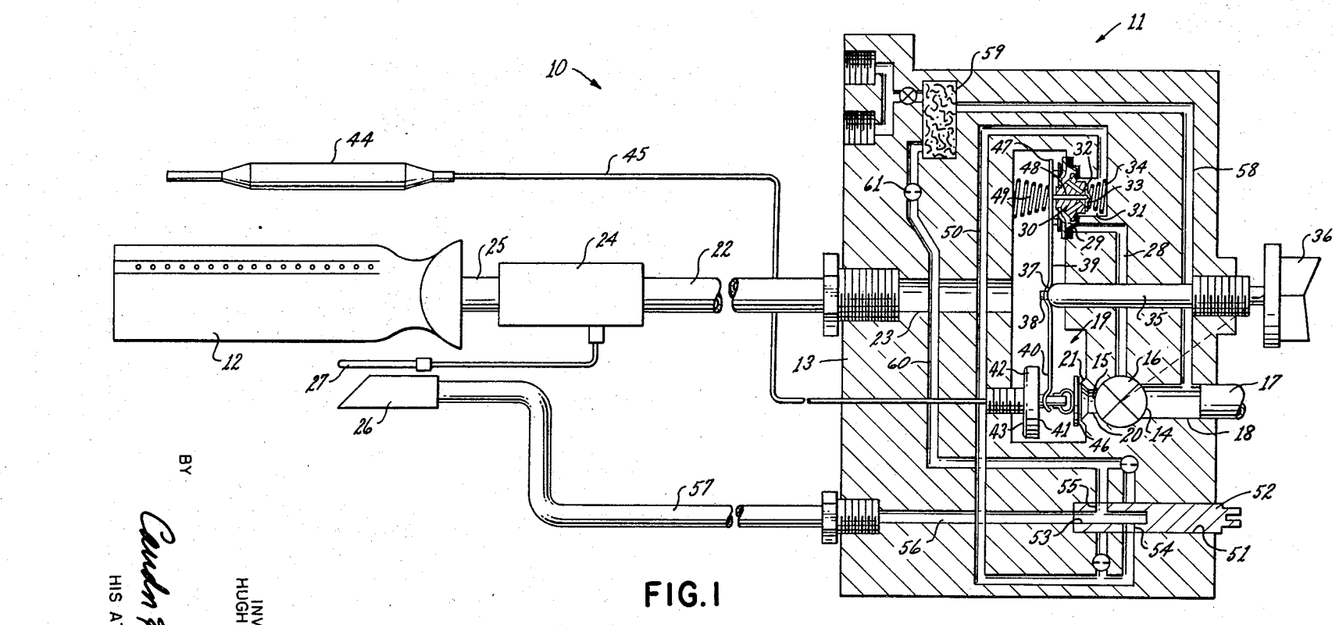
FIGURE 1 is a schematic view illustrating the improved system of this invention.

Referring now to FIGURE 1, the improved control system of this invention generally indicated by the reference numeral 10 includes a control device 11 of this invention for controlling the operation of a main burner means 12 disposed in a domestic oven or the like, the control device 11 including a housing means 13.

The housing means 13 has an inlet 14 and an outlet 15 adapted to be interconnected together by a disc valve member 16 in a manner hereinafter described, the inlet 14 being adapted to be interconnected to a fuel supply conduit 17 by a passage means 18 and the outlet 15 being adapted to be interconnected to a chamber 19 by means of a passage means 20 terminating with a valve seat 21. The chamber 19 is adapted to be interconnected to a conduit 22 by means of a passage 23, the conduit 22 leading to a safety valve 24. The outlet side of the safety valve 24 is interconnected to the main burner 12 by a conduit 25.

A pilot burner 26 is disposed in the oven and is adapted to normally have a continuously burning small standby flame in a manner hereinafter described. However, when additional fuel is supplied to the pilot burner 26 in a manner hereinafter described, the same provides a relatively large heater flame which is sensed by a bulb 27 to open the safety valve 24 and interconnect the conduits 22 and 25 together whereby as long as a heater flame appears at the pilot burner 26, the chamber 19 of the control device 11 is interconnected to the main burner 12.

However, when the heater flame ceases to exist at the pilot burner 26, the safety valve 24 closes and prevents communication between the chamber 19 of the control device 11 and the main burner means 12 for a purpose hereinafter described.

When the disc valve 16 is moved to an "on" position thereof in a manner hereinafter described, the same not only interconects the inlet 14 with the outlet 15 but also interconnects the inlet 14 with a passage means 28 leading to a chamber 29 defined by a valve seat member 30 carried by the housing 13. The chamber 29 is separated from a chamber 31 by a valve seat 32 on the valve seat member 30, the valve seat 32 being opened and closed by a valve member 33 urged to the closed position by a compression spring 34.

An axially movable fulcrum pin 35 is carried by the housing 13 in such a manner that the axial position of the fulcrum pin 35 relative to the housing 13 is controlled by a control knob 36 in a manner hereinafter described. The fulcrum pin 35 has a rounded end 37 provided with a cylindrical projection 38 passing through a suitable aperture in a lever 39 whereby the lever 39 is fulcrumed on the end 37 of the fulcrum pin 35.

One end 40 of the lever 39 bears against a movable wall 41 of an expansible and contractible element 42 having a wall 43 fixed to the housing 13, the interior of the expansible and contractible element 42 being interconnected to an oven temperature sensing bulb 44 by a conduit 45. The movable wall 41 of the expansible and contractible element 42 carries a valve member 46 for opening and closing the valve seat 21 in a manner hereinafter described.

The other end 47 of the lever 39 is adapted to engage a plunger 48 carried by the valve seat member 30 and engaging the valve member 33, the end 47 of the lever 39 being urged in a clockwise direction in FIGURE 1 by a compression spring 49. Thus, the opening and closing of the valve member 33 is controlled by the lever 39 in relation to the temperature sensed by the bulb 44 and the axial position of the fulcrum pin 35 in a manner hereinafter described.

The chamber 31 of the housing 13 is interconnected to a passage means 50 leading to a bore 51 in the housing 13, an adjusting key 52 being rotatably disposed in the bore 51 and having a longitudinal bore 53 interconnected to the exterior of the key 52 by transverse bores 54 and 55. The longitudinal bore 53 of the adjusting key 52 is disposed in communication with a passage 56 leading to a conduit 57 interconnected to the pilot burner 26.

Another passage 58 is formed in the housing 13 and is interconected with the passage 18 at a point upstream from the disc valve 16 as well as to a filter chamber 59. The filter chamber 59 is interconnected to a passage 60 leading to the bore 51 in the manner illustrated in FIGURE 1, the passage 60 having an orifice 61 therein.

Thus, it can be seen that when the adjusting key 52 is disposed in the "on" position, as illustrated in FIGURE 1, fuel from the supply conduit 17 is adapted to pass through the passages 58 and 60 to the passage 55 of the adjusting key 52 and, thus, to the pilot burner 26 to provide the previously mentioned small standby flame, which does not affect the safety valve 24.

However, when the disc valve 16 is moved to an opened position and the valve member 33 is moved to an opened position in a manner hereinafter described, the additional fuel being supplied through the passage 50 to the passage 54 of the adjusting key 52 causes the pilot burner 26 to provide a large heater flame which is sensed by the bulb 27 and causes the safety valve 24 to open and interconnect the conduits 22 and 25 together so that fuel can issue from the main burner 12 and be ignited by the pilot burner 26. However, when the valve member 33 closes, the additional supply of fuel to the pilot burner 26 is terminated whereby the large heater flame ceases to exist, even though the small standby flame continues, whereby the safety valve 24 will close and prevent fuel from issuing from the main burner 12.

Thus, as the valve member 33 cycles between its opened and closed positions in a manner hereinafter described, the main burner 12 is cycled on and off to maintain the temperature of the oven at a temperature selected by the control knob 36 in a manner hereinafter described.

Figure 4:
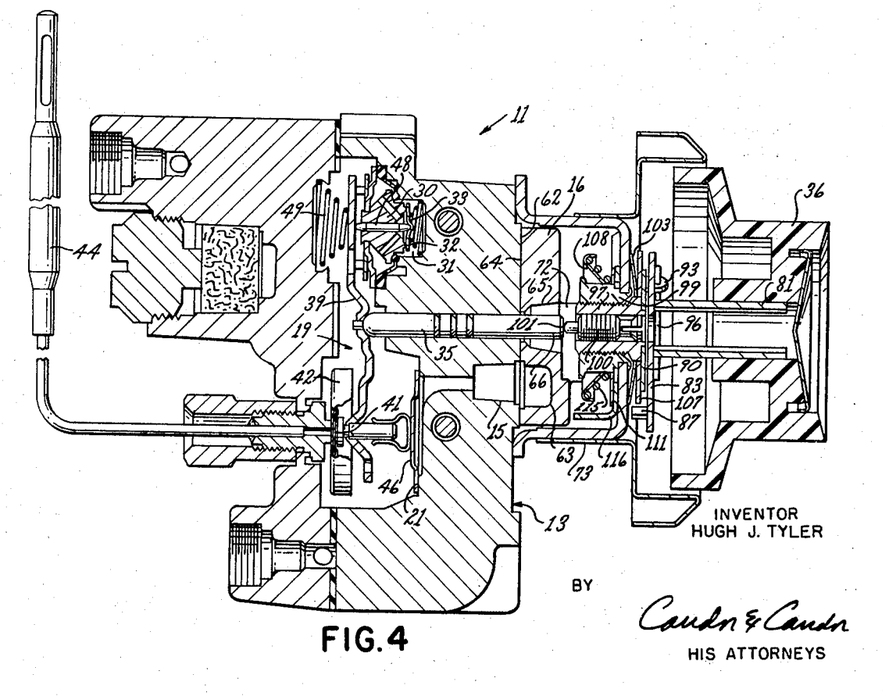
FIGURE 4 is a cross-sectional view taken on line 4—4 of FIGURE 2.
Figure 5:
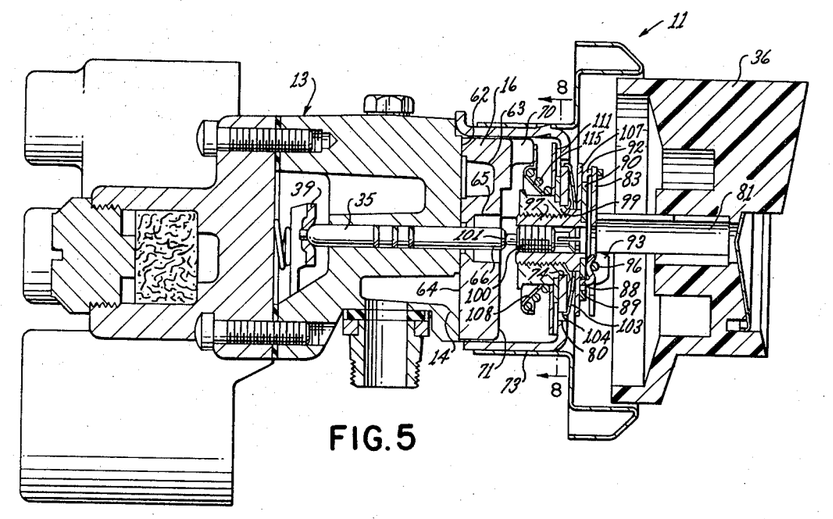
FIGURE 5 is a cross-sectional view taken on line 5—5 of FIGURE 2.

As illustrated in FIGURES 4 and 5, the housing means 13 defines a flat valve surface 62, interrupted by the spaced inlet 14 and outlet 15 adapted to be interconnected together by a groove 63 in the disc valve 16.

In particular, the groove 63 in the disc valve 16 interrupts a valve surface 64 thereof with the valve surface 64 being disposed in sealing and sliding contact with the valve seat surface 62 of the housing 13, the disc valve 16 having an opening 65 passing therethrough and loosely receiving the end 66 of the fulcrum pin 35.

Figure 6:
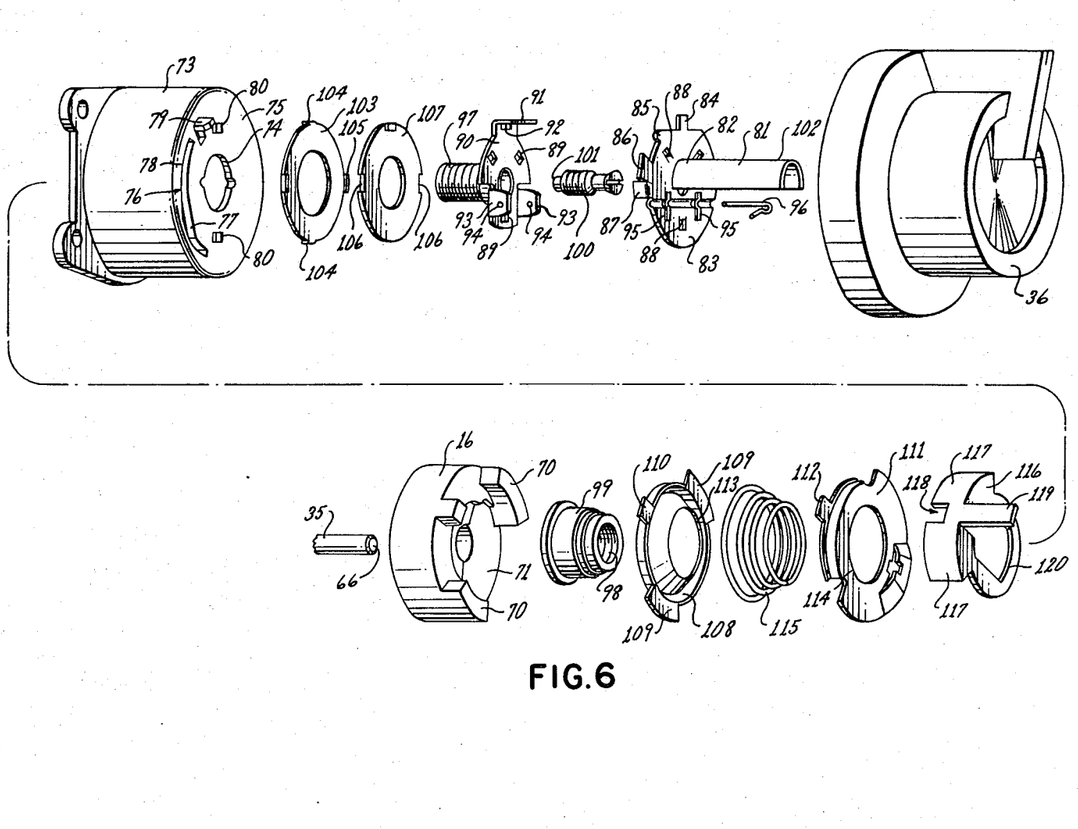
FIGURE 6 is an exploded perspective view of various parts of the control device of this invention.

As illustrated in FIGURES 5 and 6, the disc valve 16 has a pair of spaced arcuate embossments 70 formed on the side 71 thereof and a smaller substantially rectangular embossment 72 intermediate the embossments 70 for a purpose hereinafter described.

A cup-shaped member 73 forms part of the housing means 13 and is telescopically disposed over the disc valve 16, the member 73 having an aperture 74 passing therethrough in the closed end 75 thereof. The closed end 75 has a cam slot 76 formed therein and defining opposed camming edges 77 and 78 best illustrated in FIGURES 2 and 3. In addition, a stop tang 79 projects from the wall 75 and a pair of apertures 80 pass through the wall 75.

A C-shaped shaft 81 has one end 82 thereof interconnected to a plate member 83 having three outwardly projecting tangs 84, 85 and 86 and a rearwardly extending tang 87 to cooperate with the stop tang 79 in a manner hereinafter set forth. In addition, rearwardly directed tangs 88 are formed in the plate member 83 and are adapted to register with apertures 89 formed on another plate member 90.

The plate member 90 has a bent over tang 91 provided with a slot 92 and a pair of ears 93 having apertures 94 passing therethrough. The members 83 and 90 are adapted to be assembled together with the tang 84 of the member 83 received in the slot 92 of the member 90 and with the ears 93 of the member 90 passing through slots 95 of the plate member 83 and pinned thereto by a pin means 96 passing through the apertures 94. In this manner, rotation of the shaft 81 causes like rotation of the plate member 90.

The plate member 90 carries a tubular extension 97 both internally and externally threaded, the tubular extension 97 adapted to be threadedly received in a threaded bore 98 of a member 99 fixed in the aperture 74 of the housing part 73.

An adjusting screw 100 is threaded in the tubular part 97 of the plate 90 and has an end 101 adapted to abut the end 66 of the fulcrum pin 35.

Thus, rotation of the control knob 36 fastened on the other end 102 of the C-shaped shaft 81 causes the member 97 to be threaded into or out of the fixed threaded member 99 to adjust the axial position of the fulcrum pin 35.

A bowed spring-like washer 103 is provided and has tangs 104 adapted to register in the apertures 80 of the housing part 73, the spring means 103 having reversely directed tangs 105 adapted to be received in notches 106 in a washer-like member 107, the spring member 106 and washer-like member 107 being disposed between the closed wall 75 of the housing part 73 and the plate member 90 to place an outward force on the plate-like member 90, and, thus, provide "feel" in adjusting the rotational position of the knob 36 relative to the housing 13.

A spring retainer 108 is provided and has outwardly directed tangs 109 adapted to rest on the embossments 70 of the disc valve 16 and another tang 110. Another spring retainer 111 is provided has an an outwardly directed tang 112 similar to tang 110 of the spring retainer 108, retainers 108 and 111 respectively having openings 113 and 114 passing therethrough so that the same can be telescoped on the fixed threaded member 99. A compression spring 115 is adapted to be disposed between the spring retainers 108 and 111 to compact a clutch member 116 against the inside surface of the wall 75 of the housing part 73.

The clutch part 116 has a pair of depending flanges 117 defining a notch 118 therebetween adapted to not only receive the tangs 112 and 110 of the spring retainers 111 and 108, but to also receive the rectangular embossment 72 of the disc valve 16. In addition, the clutch member 116 has an outwardly directed tang 119 adapted to pass through the cam slot 76 of the housing part 73, the clutch part or drive member 116 having an aperture 120 passing therethrough to loosely receive the fixed member 99.

The operation of the control device 11 as utilized in the system 10 of this invention, with the parts heretofore described, will now be described.

Figure 2:
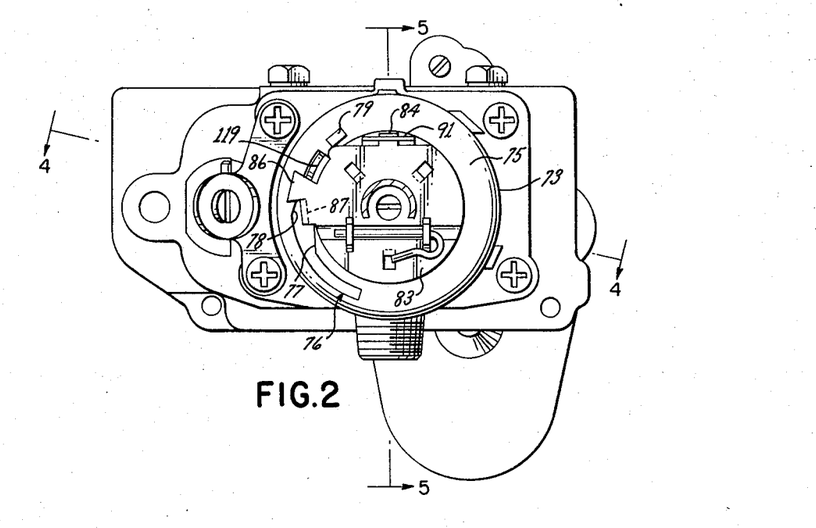
FIGURE 2 is a front view of the control device of this invention with the control knob thereof removed.

Assuming that the control knob 36 is disposed in its "off" position as illustrated in FIGURES 1 and 2, the groove 63 of the disc valve 16 is in such a position that the same does not interconnect the inlet 14 with the outlet 15 nor the inlet 14 with the passage means 28 whereby no fuel issues from the main burner means 12 and only a small standby flame exists at the pilot burner 26 as the adjusting key 52 is normally disposed in the "on" position as illustrated in FIGURE 1.

Figure 7:
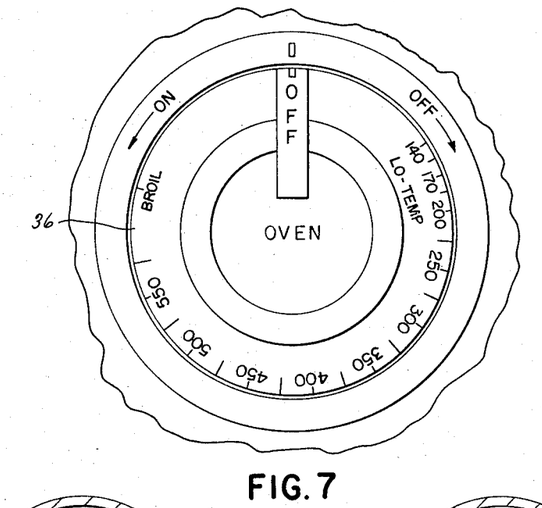
FIGURE 7 is a fragmentary front view of the control device of this invention illustrating the control knob thereof.

When the operator desires to turn on the oven to a set temperature thereof, the operator grasps the knob 36 and rotates the same in a counterclockwise direction as illustrated in FIGURE 7 whereby rotation of the knob 36 causes like rotation of the plate 83 whereby the tang 85 of plate 83 bears against the tang 119 of the drive member 116 to cause like rotation therewith. As the drive member 116 is being rotated, the same, through the notch 118 thereof, rotates the spring retainers 111 and 108 as well as the disc valve 16 to bring the groove 63 of the disc valve 16 in such a position that the same fully interconnects the inlet 14 with the outlet 15, as well as to the passage means 28.

Figure 3:
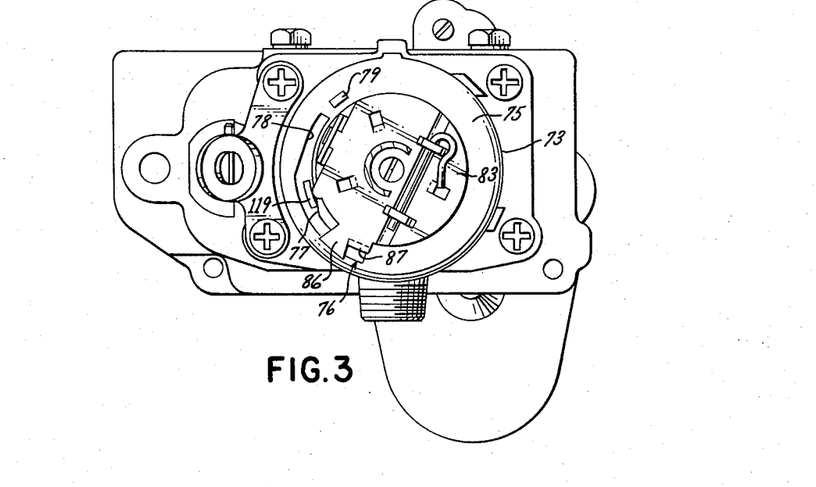
FIGURE 3 is a view similar to FIGURE 2 and illustrates the control device of this invention in another operating position thereof.
Figure 9:
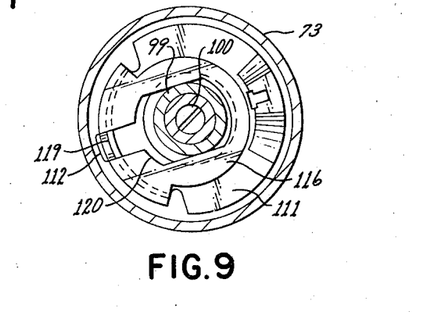
FIGURE 9 is a view similar to FIGURE 8 and illustrates the control device in another operating position thereof.

However, when the disc valve 16 is rotated to its fully "on" position, it can be seen that the edge 77 of the cam slot 76 slides the drive member 116 radially outwardly to the position illustrated in FIGURES 3 and 9 whereby the tang 85 of the plate member 83 is no longer in engagement with the tang 119 of the drive member 116 so that the control knob 36, when further rotated in a counterclockwise direction, does not further rotate the disc valve 16 from its fully "on" position. Thus, the sliding movement of the drive member 116 declutches the disc valve 16 from the control knob or manipulator means 36.

During the rotational movement of the control knob 36 from its position to a set temperature position thereof, the threaded member 97 of the plate 90 is backed out of the fixed threaded member 99 in such a manner that the fulcrum pin 35 is adjusted to a new position thereof to the right in FIGURES 4 and 5 as selected by the temperature setting of the control knob 36.

This axial movement of the pin 35 from its "off" position to its selected temperature position permits the compression spring 49 to pivot the same on the fulcrum pin 35 in such a manner that the pin 48 carried by the valve seat member 30 is moved to the right in FIGURE 4 to open the valve member 33 away from the valve seat 32 so that fuel in the passage 28 is now adapted to pass into the chamber 31 and, thus, to the pilot burner 26 to create the large heater flame at the pilot burner 26. When the large heater flame exists at the pilot burner 26, the temperature sensing bulb 27 senses the presence of the same and opens the safety valve 24 whereby fuel in the chamber 19 is adapted to flow to the main burner 12 and be ignited by the pilot burner 26.

Thus, as long as the temperature of the oven remains below the selected temperature, the main burner means 12 is operating.

However, when the temperature of the oven reaches the selected temperature, as sensed by the sensing bulb 44, the movable wall 41 of the expansible and contractible element 42 has moved to the right in FIGURE 4 to such an extent that the same pivots the lever 39 on the fulcrum pin 35 to a position which permits the valve member 33 to close against the valve seat 32 and terminate the additional flow of fuel to the pilot burner 26. Thus, the large heater flame at the pilot burner 26 ceases to exist whereby the safety valve 24 closes to terminate the flow of fuel to the main burner means 12.

Should the temperature of the oven again fall below the selected temperature, the movable wall 41 of the element 42 has moved to the left in FIGURE 4 a distance sufficient to cause the lever 39 to again open the valve member 33 so that the heater flame can again exist at the pilot burner 26. With the heater flame at the pilot burner 26, the safety valve 24 again opens so that fuel can again issue from the main burner means 12 and be ignited by the pilot burner 26.

Thus, it can be seen that the control device 11 in this invention permits the control knob 36 to be turned from an "off" position thereof to not only rotate the disc valve 16 to an "on" position thereof but to also adjust the axial position of the fulcrum pin 35 so that the control device 11 will maintain the oven at the selected temperature, the control device 11 of this invention being so constructed and arranged that the drive member 116 declutches the disc valve 16 from the control knob 36 during the rotational movement of the control knob 36 after the disc valve 16 has been disposed in its fully "on" position.

Should a malfunction occur in the control device 11 of this invention, so that the valve member 33 will not close whereby the burner means 12 remains on in a runaway condition, the increased temperature in the oven will cause the movable wall 41 of the pilot element 42 to further move to the right in FIGURE 4 to bring the valve member 46 closer to the valve seat 21 to throttle the flow of fuel to the burner means 12 in such a manner that the burner means 12 cannot produce a temperature in the oven above a predetermined safe temperature.

Figure 8:
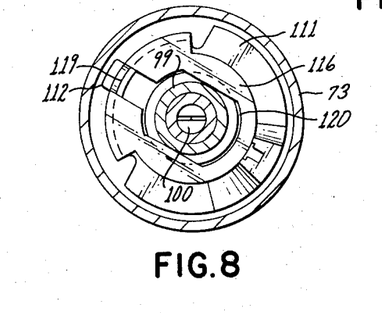
FIGURE 8 is a cross-sectional view taken on line 8—8 of FIGURE 4.

When it is desired to turn off the system 10 of this invention, the operator rotates the control knob 36 back to the "off" position illustrated in FIGURE 2. As the plate 83 is being rotated to its "off" position, the tang 86 thereof engages the tang 119 of the drive member 116 and rotates the drive member 110 therewith, whereby the disc valve 16 is rotated back to its "off" position, the drive member 116 sliding radially inwardly relative to the disc valve 16 by means of the edge 78 of the cam slot 76 in the housing part 73 from the position illustrated in FIGURE 9 back to the position illustrated in FIGURE 8. As the control knob 36 is rotated back to its "off" position, the tang 119 on the drive member 116 engages the end of the slot 76 when the control knob is disposed in its "off" position whereby the cam slot 76 determines the "off" position of the control knob 36.

However, when the control knob 36 is moved in an "on" direction, the fully "on" position of the control knob is limited by the tang 87 of the plate 83 engaging the stop tang 79 on the housing part 73.

While the control device 11 of this invention has been previously described as being particularly adaptable for controlling the operation of a domestic oven or the like, it is to be understood that the various features of this invention can be utilized in controls for other devices as desired.

Figure 10:
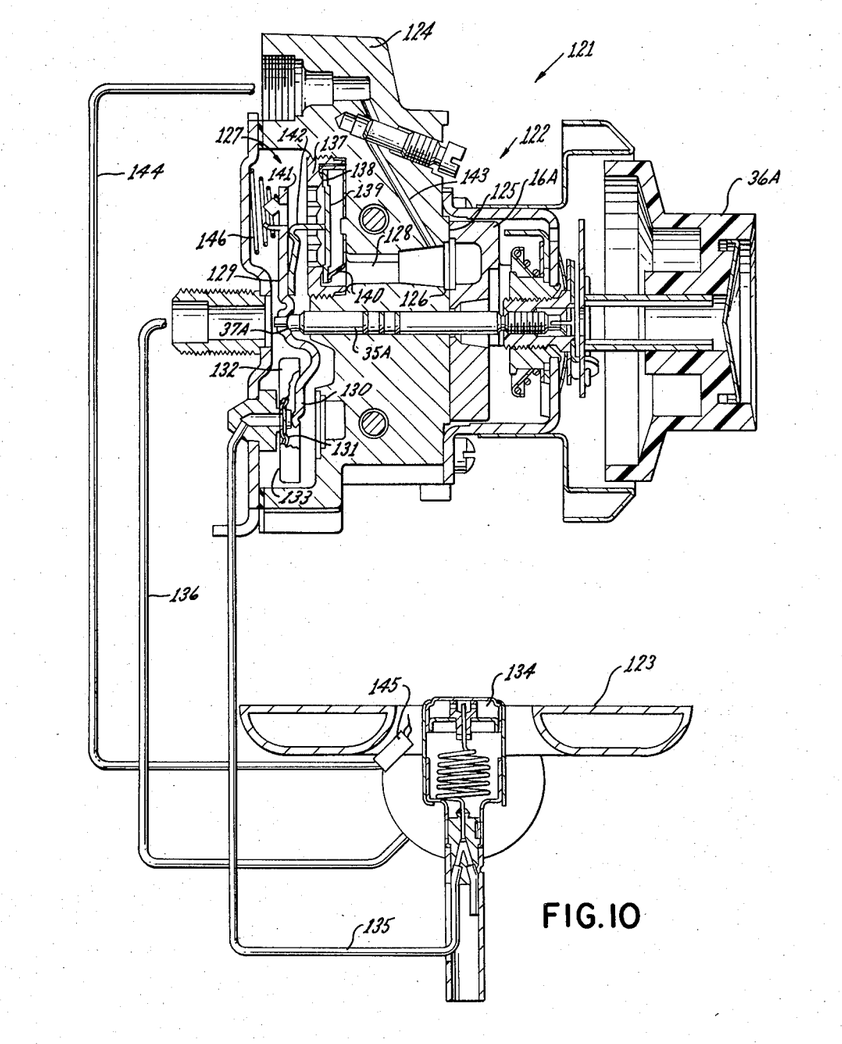
FIGURE 10 is a view similar to FIGURE 4 and illustrates another embodiment of this invention.

For example, the various fatures of this invention can be utilized in a system generally indicated by the reference numeral 121 in FIGURE 10 to produce a control device 122 utilized to control the operation of a top burner 123 for a range or the like.

In particular, the control device 122 includes a housing means 124 having a valve seat surface 125 interrupted by an inlet (not shown) and an outlet 126, the inlet being interconnected to a fuel supply manifold in the same manner as the inlet 14 of the control device 11 previously described.

A disc valve 16A is provided and is formed in the same manner as the disc valve 16 previously described and is operated by a control knob 36A in the manner previously described whereby like parts of the control device 121 and the control device 11 will be indicated by like reference numerals followed by the reference letter "A."

The housing 124 defines a chamber 127 interconnected to the outlet 126 by a passage means 128. A lever 129, in a manner similar to the lever 39, is fulcrumed in the chamber 127 on the end 37A of the fulcrum pin 35A which is adjusted in the same manner by the control knob 36A as the fulcrum pin 35 previously described.

One end, 130 of the lever 129, engages a movable wall 131 of an expansible and contractible element 132 having a wall 133 fixed to the housing 124, the interior of the expansible and contractible element 132 being interconnected to a temperature sensing bulb 134 by a conduit means 135. The temperature sensing bulb 134 is disposed in the middle of the top burner 123 so as to act in a conventional manner to sense the temperature of the vessel disposed on the burner means 123.

The chamber 127 of the housing 124 is also interconnected to the main burner 123 by a conduit 136.

The passage 128 in the housing 124 is separated from the chamber 127 by a valve seat member 137 having a valve seat 138 opened and closed by a valve member 139 urged to the closed position by a leaf spring means 140. However, the other end 141 of the lever 129 carries a tang 142 passing through the valve seat member 137 and engaging the valve member 139.

The passage 128 in housing 124 is interconnected by passage means 143 and conduit 144 to a standby pilot burner 145 which is adapted to ignite fuel issuing from the main burner 123.

The operation of the control device 121 will now be described.

Then the operator turns the control knob 36A from the "off" position thereof to a selected "on" position thereof, the rotational movement of the control knob 36A causes like rotational movement of the disc valve 16A until the disc valve 16A is disposed in its full "on" position whereby the control knob 36A is declutched from the disc valve 16A in the same manner as described for the control device 11. In addition, the rotational movement of the control knob 36A permits the fulcrum pin 35A to move to the right in FIGURE 10 to a set temperature setting position thereof as indicated by the control knob 36A. In this manner, since the temperature of the vessel sitting on the burner means 123 is below the selected temperature, the movable wall 131 of the thermostat device 132 is in such a position that a compression spring 146 causes the lever 129 to pivot on the fulcrum pin 35A in such a manner that the same opens the valve member 139 so that fuel can flow from the passage into the chamber 127 and, thus, through the conduit 136 to the burner means 123 to be ignited by the pilot burner 145.

As long as the temperature of the vessel on the burner 123 remains below the selected temperature, the valve member 139 remains in its open position and fuel issues from the burner 123.

However, when the temperature of the vessel on the burner 123 reaches the selected temperature, the movable wall 131 of the thermostat 132 has moved to the right a distance sufficient to cause the lever 129 to close the valve member 139 whereby no more fuel can issue from the main burner 123. As the temperature of the vessel falls below the selected temperature, the lever 129, under the influence of the thermostat 132, again opens the valve member 139 so that fuel can issue from the burner means 123.

In this manner, the burner means 123 is cycled between its "off" and "on" positions to maintain the temperature of the vessel on the burner means 123 at the selected temperature.

Thus, it can be seen that the clutch mechanism of this invention is so constructed and arranged that the same readily permits the disc valve 16A to be turned to its "on" position and be declutched from the control knob 36A so that the control knob 36A can further set the temperature setting position of the fulcrum pin 35A without further affecting the disc valve 16A until the control knob 36A is turned to its "off" position to cause the disc valve 16A to return to its "off" position in the manner previously described.

The clutching mechanism for the control device 121 of this invention can be further modified to permit the operator to select the desired height of flame which will be produced at the burner means 123 when the burner means is cycled on in the manner previously described.

Figure 11:
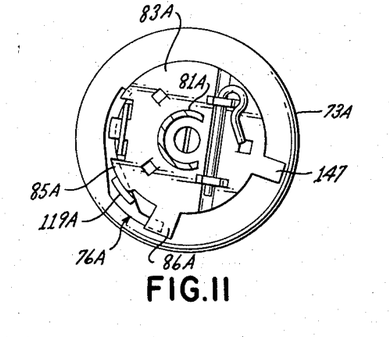
FIGURE 11 is a view similar to FIGURE 2 and illustrates the control device of FIGURE 10 in one operating position thereof.
Figure 12:
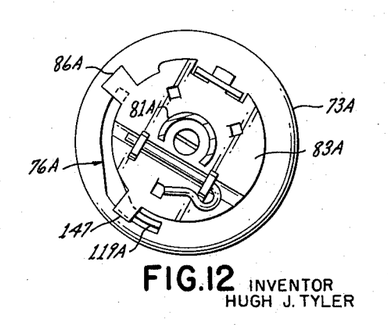
FIGURE 12 is a view similar to FIGURE 11 and illustrates the control device of FIGURE 10 in another operating position thereof.

In particular, reference is made to FIGURES 11 and 12 wherein the control device 121 of this invention is partially illustrated in end views with the control knob removed. However, it can be seen that the plate member 83A interconnected to the control shaft 81A not only as the outwardly directed tangs 86A and 85A but also another outwardly directed tang 147.

Thus, when the control knob 36A is turned from the "off" position to an "on" position thereof, the tang 85A of the plate member 83A drives the tang 119A of the clutch member 116A until the cam slot 76A slides the clutch member 116A out in engagement with the tang 85A in the manner illustrated in FIGURE 11 whereby the disc valve 16A fully interconnects the inlet to the outlet 126 to produce a maximum height flame at the burner means 123.

However, if the operator wishes to reduce the size of the flame which will be produced at the burner means 123, the operator rotates the control knob 36A in a counterclockwise direction past the "broil" position thereof to a "flame set region" thereof whereby the tang 147 engages the tang 119A of the clutch member 116A in the manner illustrated in FIGURE 12 to further rotate the disc valve 16A relative to the valve surface 125 to reduce the amount of interconnection between the inlet and the outlet 126 so that the resulting flame at the main burner 123 may be reduced in height.

Thereafter, the operator turns the control knob 36A back to a desired temperature setting position thereof whereby the control device 121 will maintain the temperature of the vessel setting on the burner means 123 at the selected temperature by means of a reduced flame size at the burner means 123 which is cycled on and off in the manner previous described.

Accordingly, it can be seen that the control device 121 of this invention is not only adapted to control the operation of a top burner for a domestic range or the like, but also the control device 121 of this invention is adapted to adjust the height of the flame at that top burner in a unique and novel manner.

Therefore, it can be seen that this invention not only provides an improved control device having many unique and novel features, but also this invention provides improved parts for such a control device or the like.

While the form of the invention now preferred has been disclosed as required by the statutes, other forms may be used, all coming within the scope of the claims which follow.

What is claimed is:

1. In combination, a housing means having an inlet and an outlet, a movable valve means for varying the degree of interconnection between said inlet and said outlet, a movable manipulator means carried by said housing means, and interconnection means for interconnecting said manipulator means with said valve means to move said valve means in the same direction that said manipulator means is being moved, said interconnection means being drivingly interconnected to said valve means while being slidable relative thereto so that said manipulator means moves said valve means until said interconnection means slides out of engagement with said manipulator means during movement of said manipulator means in one direction.

2. In combination, a housing means having a cam means and having an inlet and an outlet, a movable valve means for varying the degree of interconnection between said inlet and said outlet, a movable manipulator means carried by said housing means, and interconnection means for interconnecting said manipulator means with said valve means to move said valve means in the same direction that said manipulator means is being moved, said interconnection means being drivingly interconnected to said valve means while being slidable relative thereto so that said manipulator means moves said valve means until said cam means slides said interconnection means out of engagement with said manipulator means in one direction.

3. A combination as set forth in claim 2 wherein said cam means comprises a slot means in said housing means.

4. A combination as set forth in claim 3 wherein said interconnection means projects through said slot means and bears against one edge thereof.

5. In combination, a housing means having a cam means and having two inlets and two outlets, movable valve means for varying the degree of interconnection between said inlets and said outlets, a movable manipulator means carried by said housing means for adjusting one of said valve means during the entire range of movement of said manipulator means, and interconnection means for interconnecting said manipulator means with the other valve means to move said other valve means in the same direction that said manipulator means is being moved, said interconnection means being drivingly interconnected to said other valve means while being slidable relative thereto so that said manipulator means moves said other valve means until said cam means slides said interconnection means out of engagement with said manipulator means during movement of said manipulator means in one direction.

6. In combination, a housing means having a cam means and having an inlet and an outlet, a movable valve member for varying the degree of interconnection between said inlet and said outlet, a drive member drivingly interconnected to said valve member while being slidable relative thereto, said drive member having a projection engageable with said cam means, and a movable manipulator means carried by said housing means and having a first drive means for engaging said projection to move said valve member in one direction until said cam means slides said drive member to move said projection out of engagement with said first drive means whereby further movement of said manipulator means in said one direction does not further move said valve member, said manipulator means having a second drive means engageable with said projection to move said valve member in the other direction when said manipulator means is moved in said other direction.

7. A combination as set forth in claim 6 wherein said housing means carries temperature responsive means and wherein said manipulator means varies the setting of said temperature responsive means.

8. In combination, a housing means having a cam means and an inlet and an outlet, a movable valve member for varying the degree of interconnection between said inlet and said outlet, a drive member drivingly interconnected to said valve member while being slidable relative thereto, said drive member having a projection engageable with said cam means, and a movable manipulator means carried by said housing means, said manipulator means having three ranges of movement in one direction and having three drive means, one of said drive means engaging said projection to move said valve member during the first range of movement of said manipulator means whereby said cam means slides said drive member to move said projection out of engagement with said first drive means so that said manipulator means does not affect said valve member during the second range of movement of said manipulator means, the second drive means engaging said projection to further move said valve member during the third range of movement of said manipulator means, the third drive means being engageable with said projection to move said valve member back to its original position when said manipulator means is moved in the other direction to its original position.

9. In combination, a housing means having an inlet and an outlet, a movable valve member for varying the degree of interconnection between said inlet and said outlet and having a projection, a movable manipulator means carried by said housing means, and a drive member having a slot means receiving said projection to drivingly interconnect said drive member to said valve member while being slidable relative thereto, said manipulator means being interconnected to said drive member to move said valve member in the same direction that said manipulator means is being moved until said drive member slides out of interconnection with said manipulator means.

10. In combination, a housing means having a cam slot and an inlet and an outlet, a movable valve member for varying the degree of interconnection between said inlet and said outlet and having a projection, a movable manipulator means carried by said housing means, and a drive member having a slot means receiving said projection to drivingly interconnect said drive member to said valve member while being slidable relative thereto, said drive member having a projection extending through said cam slot, said manipulator means engaging said projection of said drive member to move said valve member when said manipulator means is moved until said cam slot slides said drive member out of engagement with said manipulator means.

11. A combination as set forth in claim 10 wherein spring means is operatively disposed between said drive member and said valve member.

12. In combination, a housing means having a cam slot and an inlet and an outlet, a movable valve member for varying the degree of interconnection between said inlet and said outlet and having a projection, a movable manipulator means carried by said housing means, and a drive member having opposed peripheral flange means, one of said flange means projecting through said cam slot and the other flange means being bifurcated to straddle said projection so that said drive member is drivingly interconnected to said valve member while being slidable relative thereto, said manipulator means engaging said one flange means of said drive member to move said valve member when said manipulator means is moved until said cam slot slides said drive member out of engagement with said manipulator means.

13. A combination as set forth in claim 12 wherein a pair of plate-like means are disposed between said drive member and said valve member.

14. A combination as set forth in claim 13 wherein a compression spring is disposed between said plate-like means to urge said drive member against said housing means.

15. A combination as set forth in claim 13 wherein said plate-like means each has an outwardly projecting tang straddled by said other flange means whereby said plate-like means move in unison with said valve member.

16. A combination as set forth in claim 12 and including a valve controlling lever carried by said housing means, a fulcrum pin axially movable in said housing means and having an end on which said lever is fulcrumed, said manipulator means being axially movable and engaging the other end of said pin whereby said fulcrum pin is axially adjusted by said axial movement of said manipulator means.

17. A combination as set forth in claim 16 wherein said drive member has an opening passing therethrough and telescopically receiving said manipulator means.

References Cited
UNITED STATES PATENTS

| | | | |
|---|---|---|---|
| 2,696,877 | 12/1954 | Hollman | 236—1 X |
| 2,898,046 | 8/1959 | Eskin et al. | 236—21 |
| 3,215,349 | 11/1965 | Frendock | 236—99 |

EDWARD J. MICHAEL, *Primary Examiner.*